(12) United States Patent
Heckel et al.

(10) Patent No.: US 8,755,982 B2
(45) Date of Patent: Jun. 17, 2014

(54) DISTANCE CONTROLLER WITH AUTOMATIC STOP FUNCTION

(75) Inventors: Joerg Heckel, Rutesheim (DE); Thilo Leineweber, Shanghai (CN); Stefan Knoll, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 867 days.

(21) Appl. No.: 12/600,451

(22) PCT Filed: Jun. 23, 2008

(86) PCT No.: PCT/EP2008/057968

§ 371 (c)(1),
(2), (4) Date: Nov. 16, 2009

(87) PCT Pub. No.: WO2009/019068

PCT Pub. Date: Feb. 12, 2009

(65) Prior Publication Data

US 2010/0152963 A1   Jun. 17, 2010

(30) Foreign Application Priority Data

Aug. 3, 2007 (DE) .......................... 10 2007 036 787

(51) Int. Cl.
G06F 7/70 (2006.01)

(52) U.S. Cl.
USPC .............................. 701/70; 340/5.1; 342/189

(58) Field of Classification Search
CPC .................... B60W 2420/54; B60W 50/0205; B60W 30/17
USPC .............................. 701/70; 340/5.1; 342/189
See application file for complete search history.

(56) References Cited

U.S. PATENT DOCUMENTS

| 5,235,315 A | * | 8/1993 | Cherry et al. | 340/435 |
| 5,987,395 A | * | 11/1999 | Donges | 702/158 |
| 6,856,919 B1 | * | 2/2005 | Bastian et al. | 702/40 |
| 2007/0273490 A1 | | 11/2007 | Fuchs et al. | |

(Continued)

FOREIGN PATENT DOCUMENTS

| DE | 103 41 127 | 3/2005 |
| DE | 103 41 128 | 3/2005 |

(Continued)

OTHER PUBLICATIONS

International Search Report, PCT International Patent Application No. PCT/EP2008/057968, dated Dec. 15, 2008.

*Primary Examiner* — John Q Nguyen
*Assistant Examiner* — Jordan S Fei
(74) *Attorney, Agent, or Firm* — Kenyon & Kenyon LLP

(57) ABSTRACT

A distance controller having an automatic stop and/or start function for motor vehicles, having a distance-measuring remote region sensor, a distance-measuring ultrasound sensor, and a control unit designed to intervene in the longitudinal guiding of the home vehicle as a function of the distance, measured by the remote region sensor, from a vehicle traveling ahead. If the measured distance is smaller than the range of the ultrasound sensor, on the basis of the signal of the ultrasound sensor it is verified whether this sensor is functional. If yes, the signal of the ultrasound sensor is evaluated in the context of the stop and/or start function. According to the present invention, the stop and/or start function has an operating mode in which a distance controlling takes place on the basis of the signal of the ultrasound sensor. In this way, the distance from the vehicle ahead can be reduced during stop and go operation.

7 Claims, 8 Drawing Sheets

(56) References Cited

U.S. PATENT DOCUMENTS

2007/0297288 A1 12/2007 Boecker et al.
2008/0258964 A1* 10/2008 Schoeberl et al. ............ 342/189
2008/0266052 A1* 10/2008 Schmid ......................... 340/5.1
2009/0204289 A1* 8/2009 Lehre et al. .................... 701/36
2009/0248267 A1* 10/2009 Boecker ......................... 701/70

FOREIGN PATENT DOCUMENTS

| DE | 10 2004 047177 | 4/2006 |
| DE | 10 2005 009702 | 9/2006 |
| DE | 10 2005 022676 | 11/2006 |
| DE | 10 2005 046045 | 3/2007 |
| EP | 1 726 501 | 11/2006 |
| EP | 1 772 338 | 4/2007 |

* cited by examiner

DISTANCE CONTROLLER WITH AUTOMATIC STOP FUNCTION

FIELD OF THE INVENTION

The present invention relates to a distance controller having an automatic stop and/or start function for motor vehicles, having a distance-measuring remote region sensor, a distance-measuring ultrasound sensor, and a control unit that is designed to intervene in the longitudinal guiding of the home vehicle as a function of the distance, measured by the remote region sensor, from a vehicle traveling ahead, and, if the measured distance is less than the range of the ultrasound sensor, to verify on the basis of the signal of the ultrasound sensor that said sensor is functional, and then to evaluate the signal of the ultrasound sensor in the context of the stop and/or start function.

BACKGROUND INFORMATION

Such a distance controller is described in German Patent Application No. DE 10 2005 009 702 A1, and is part of a driver assistance system, also called an ACC (Adaptive Cruise Control) system, and is used to automatically control the distance from a vehicle traveling ahead to a specified target distance, generally as a function of speed. For this purpose, as a remote region sensor a long-range radar (LRR) sensor is generally provided with which the distances and relative speeds, and also the azimuth angles, of vehicles traveling ahead are measured. On the basis of the azimuth angle, the vehicle traveling immediately ahead in the home lane is then identified, and this vehicle is chosen as the target object for the distance controlling. If no target object is present, controlling takes place to a desired speed selected by the driver.

In the conventional ACC systems, the distance controlling function is generally available only at speeds greater than a certain minimum speed, for example 30 km per hour, because these systems are generally provided for trips on highways or well-finished rural roads, and do not react to standing objects. ACC systems are also under development that have an automatic stop and/or start function, called a stop and go function, making it possible to brake the vehicle automatically to a standstill if, for example when approaching the end of a traffic jam, the radar sensor determines that the target object is stopped.

In some cases, an automatic restart function is also provided, so that the vehicle automatically moves back into motion if the radar sensor determines that the target object has started to move. Under some conditions, for example after the elapsing of a determined standstill time or on the basis of a configuration correspondingly selected by the driver, the system may operate in such a way that the start process is initiated only if the driver has previously received a start indication and has confirmed it by an input operation.

For the stop and go function, in general a more complex sensor system and evaluation algorithm are required, because the system now also has to react to stationary objects, and also because uninterrupted monitoring of the close range is now required, because, for example in congested traffic, persons or other obstacles may be situated in the close range immediately in front of the vehicle. A single LRR is not sufficient for a complete monitoring of the close range area, because due to the divergent radar lobe, dead angles result on both sides of the radar lobe.

Therefore, in some cases the LRR is supplemented with two short-range radar (SRR) sensors that monitor the near field.

In the German patent application described above, in contrast, it is proposed for the monitoring of the near field to use ultrasound sensors that are generally already present anyway as a component of an electronic parking assistance system in the vehicle. The ultrasound sensors also make it possible to locate objects and to measure their distance from the vehicle. However, for distance controlling during travel the range of the ultrasound sensors is not sufficient. According to the proposal in the German application, however, the ultrasound sensors can be used to check, before a start process, whether obstacles are situated in the near field in front of the home vehicle. Moreover, because the location areas of the LRR and of the ultrasound sensor system (USS) overlap, in situations in which a target object is situated in the location area of both systems a mutual functional test of the systems is possible. If the ultrasound sensors are to be used in the decision concerning an automatic starting process, this is particularly essential, because deposits of dirt or snow on the ultrasound sensors can easily result in a decrease in sensitivity or a complete occlusion.

In the conventional system, the signal of the ultrasound sensors is evaluated only for the decision as to whether a risk-free starting of the vehicle is possible or not. The actual longitudinal guiding of the vehicle, i.e., the controlling of the acceleration and slowing processes by which the distance to the target object is regulated and stop processes are controlled in such a way that the vehicle comes to a stop at an appropriate distance behind the target object, takes place solely on the basis of the distance signals supplied by the remote region sensor.

However, in the case of very small distances the distance measurements carried out with the aid of the LRR are too imprecise. Therefore, in conventional stop and go systems the stop distance at which the home vehicle is brought to a stop behind the target object is on the order of magnitude of approximately 5 meters, and is thus within a distance range in which an evaluable LRR signal is still present. The restarting takes place only with a relatively low dynamic. In particular, the starting process can be initiated only if the LRR has reliably determined that the vehicle ahead has again started to move. In traffic jam situations on highways or on rural roads, this system behavior is completely acceptable. However, in standing traffic, in view of the limited space and the traffic capacity, limited by the length of the green phases of traffic lights, it would be desirable for the stop distances to be shortened, and for it to be possible to carry out the automatic starting processes more dynamically.

SUMMARY

Therefore, an object of the present invention is to create a distance controller of the type named above that enables a higher dynamic during stopping and/or starting processes, and in particular is better suited for use in city traffic.

According to an example embodiment of the present invention, this object may be achieved in that the stop and/or start function has an operating mode in which a distance controlling takes place on the basis of the signal of the ultrasound sensor.

According to an example embodiment of the present invention, the signal of the ultrasound sensor is thus used not only to check, before a start process, whether the lane is free; rather, at least in certain operating phases the distance signal supplied by the ultrasound system is used directly as a guide quantity for the interventions in the longitudinal guiding of the vehicle.

Because with the aid of the ultrasound sensor system precise distance measurements are possible even within a range significantly less than 5 meters, the stop process can be controlled in such a way that the vehicle comes to stop at a significantly smaller distance, for example a distance of approximately 2 meters, behind the stationary target object, corresponding to the standard and appropriate behavior of a human driver, for example when approaching a line at a traffic light.

Likewise, if an automatic start function has been implemented and activated, the starting of the target object can be recognized earlier, and the starting process of the home vehicle can correspondingly also be initiated earlier and with a greater dynamic, corresponding to the dynamic of the target object, so that in particular in city traffic a driving characteristic that promotes traffic flow but is nonetheless safe is achieved.

In a particularly advantageous specific embodiment, the control unit has a "city mode" in which a stop process is executed as follows when the vehicle approaches a stationary obstacle. The remote region sensor determines that the target object is stopping, and the control unit initiates a corresponding slowing of the home vehicle, which is designed, as in conventional systems, in such a way that the vehicle will come to a stop at a distance of for example 5 meters from the obstacle. If, however, the distance from the target object has decreased enough that the object would also be detectable by the ultrasound sensors, the ultrasound sensor system is activated, and it is checked whether the ultrasound sensors also locate the target object. If this is the case, it can be considered certain that the ultrasound sensors are functional and are not occluded. Instead of now bringing the vehicle to a complete standstill, the control unit causes the vehicle to go into a creep mode in which it continues to approach the target object at a very low speed, while the distance from the target object is monitored using the ultrasound sensor system. The vehicle is not brought to stop until a significantly smaller distance, for example 2 meters, has been reached.

According to a development, an automatic start function can be provided in which the ultrasound sensor system is at first used in the standard manner in order to determine whether the area immediately in front of the vehicle is free. If this condition is met, and if moreover, now using the ultrasound sensor system, it is determined that the target object is again in motion, the start process of the home vehicle is initiated, during which the acceleration is controlled in such a way that the distance from the target object, measured by the ultrasound sensors, is gradually increased (starting for example from an original distance of 2 meters), in a manner corresponding to the increasing vehicle speed, until finally a distance (for example greater than 5 meters) is reached, at which point a changeover is made to conventional following travel regulation using the remote region sensor.

If, during the functional test, it was determined that the ultrasound sensor system is not operating correctly, an automatic start process may nonetheless be initiated, if warranted only after confirmation of a start command by the driver, but with a lower dynamic, and solely on the basis of the distance data from the remote region sensor. Thus, despite the failure of the ultrasound sensor system a safe distance can be maintained from the target object; moreover, due to the lower starting dynamic the driver has the opportunity to intervene in or abort the start process if he determines that obstacles are present in the area immediately in front of the vehicle.

Optionally, such an automatic start process having a lower dynamic, carried out solely on the basis of the distance signal from the remote region sensor, can also be initiated if the ultrasound sensor system detects an object at close range. For example, as a reaction to the location of the object an optical and/or acoustic warning signal can be outputted to the driver, and if the driver nonetheless confirms, for example by pushing a button, that the start process is to be initiated, the signals of the ultrasound sensor system are ignored and the start process is executed with a lower dynamic, on the basis of the signal of the remote region sensor.

BRIEF DESCRIPTION OF THE DRAWINGS

An exemplary embodiment of the present invention is shown in the figures and is explained in detail below.

DETAILED DESCRIPTION OF EXAMPLE EMBODIMENTS

Figure 1:
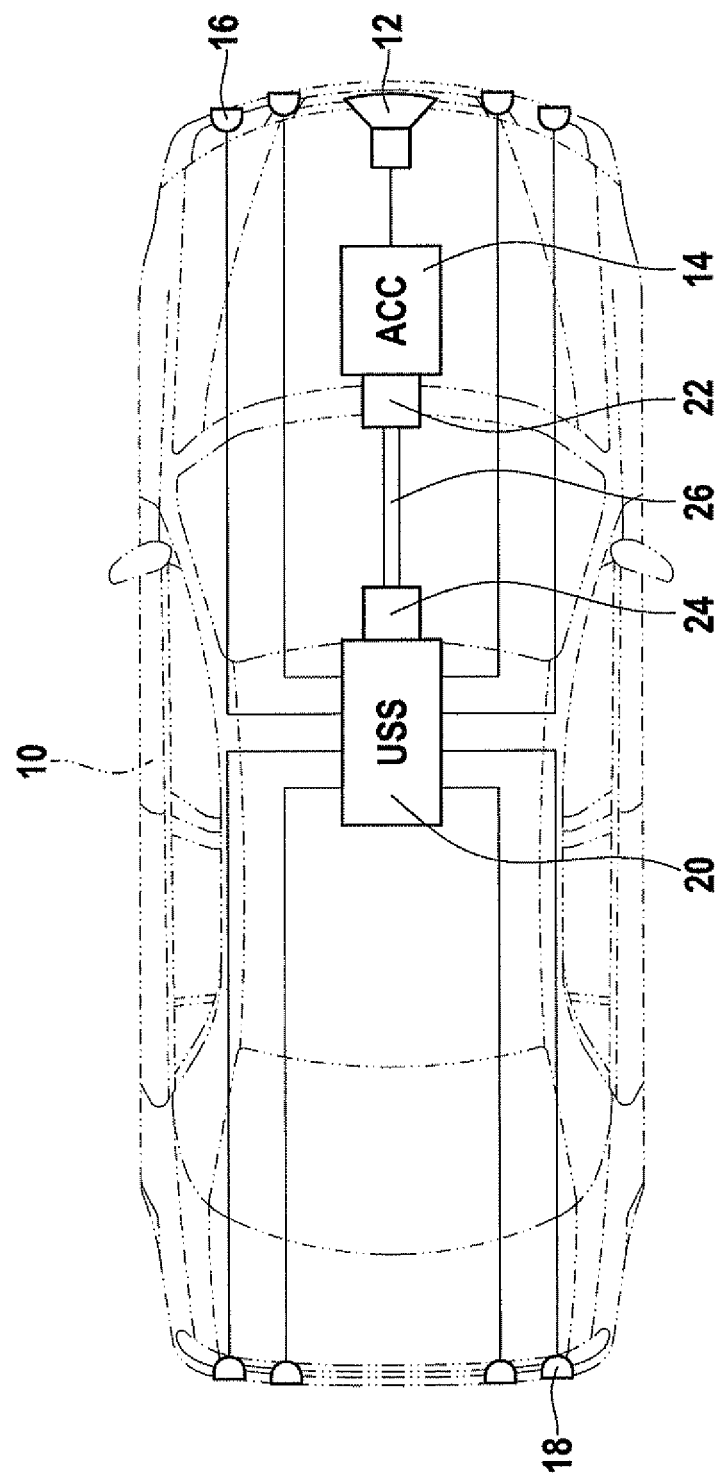
FIG. 1 shows a schematic representation of a vehicle having a distance controller according to an example embodiment of the present invention.

FIG. 1 shows the outline of a motor vehicle 10 that is equipped with an ACC system that contains a distance controller having a stop and go function. The essential components of the distance controller are: a remote region sensor 12, for example a lidar sensor or a long-range radar sensor (LRR), and an associated control unit 14 that is formed by a known electronic data processing system and associated software. Remote region sensor 12 is installed in the front center area of the vehicle and is used in particular to locate vehicles traveling ahead that are situated in a relatively broad distance range in front of vehicle 10.

Moreover, vehicle 10 has a plurality of ultrasound sensors 16 in its front part, and has in its rear part a plurality of ultrasound sensors 18 that, together with a common driver circuit 20, form an ultrasound sensor system (USS) that has in particular the function of an electronic parking assistance system. Control unit 14 of the ACC system and driver unit 20 of the USS system communicate with each other via respective interfaces 22 and 24 and via a data bus 26, for example an CAN bus or a FlexRay bus, so that in particular the front ultrasound sensors 16 may also be used by the distance controller. Via data bus 26, control unit 14 also communicates with other vehicle components (not shown), in particular with sensors for acquiring the dynamic data of vehicle 10 (wheel speeds, yaw rate, steering angle, etc.) and actuators (engine management, braking system), via which the ACC system intervenes in the longitudinal guiding of the vehicle.

Driver unit 20 of the USS system can receive a request for object detection from the ACC system via data bus 26, and can thereupon activate front ultrasound sensors 16. Conversely, driver unit 20 can report status information to control unit 14 concerning the USS system, determined for example with the aid of a self-test, as well as distance and position information concerning any objects detected by ultrasound sensors 16.

The communication and cooperation between the ACC system and the USS system relates in particular to stop and start processes of vehicle 10, and is now illustrated on the basis of typical traffic situations. Here it is assumed that the ACC system has been set to an operating mode that is suitable in particular for conditions in city traffic (city mode).

Figure 2A:
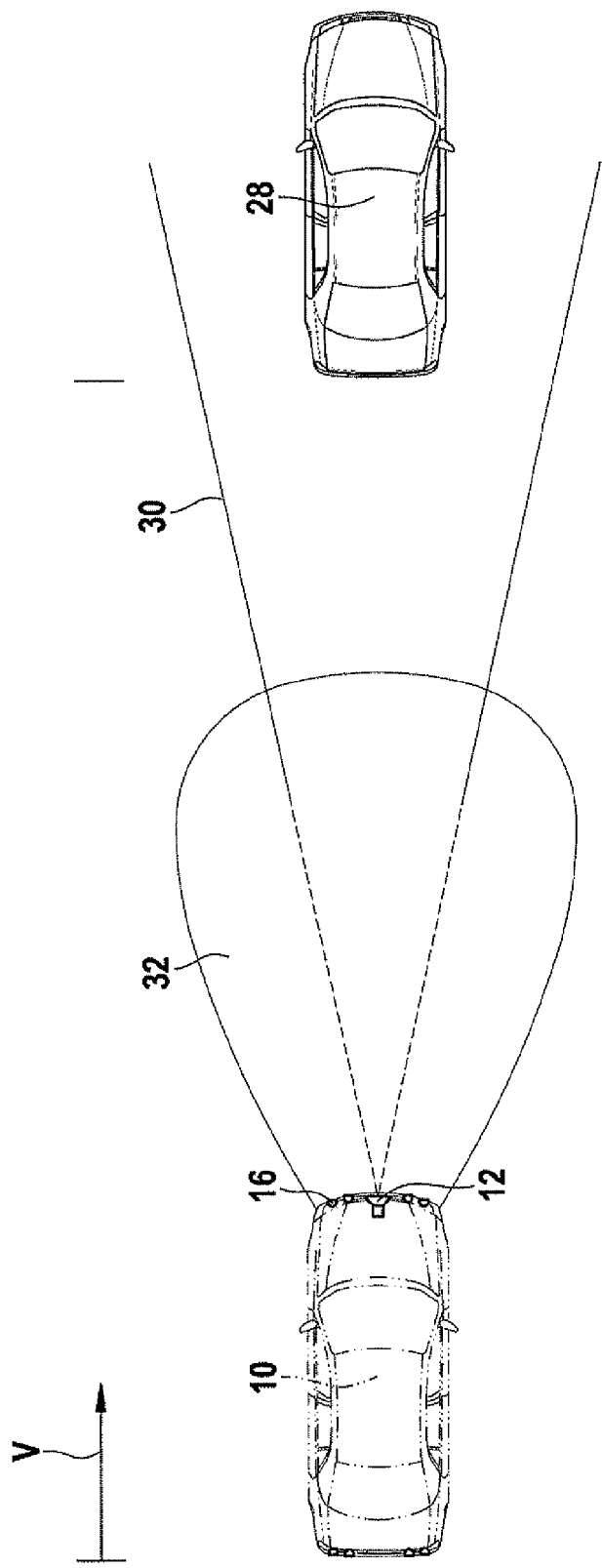
FIGS. 2a-c show an illustration of the sequence of a stop process controlled with the aid of the distance controller.
Figure 2B:
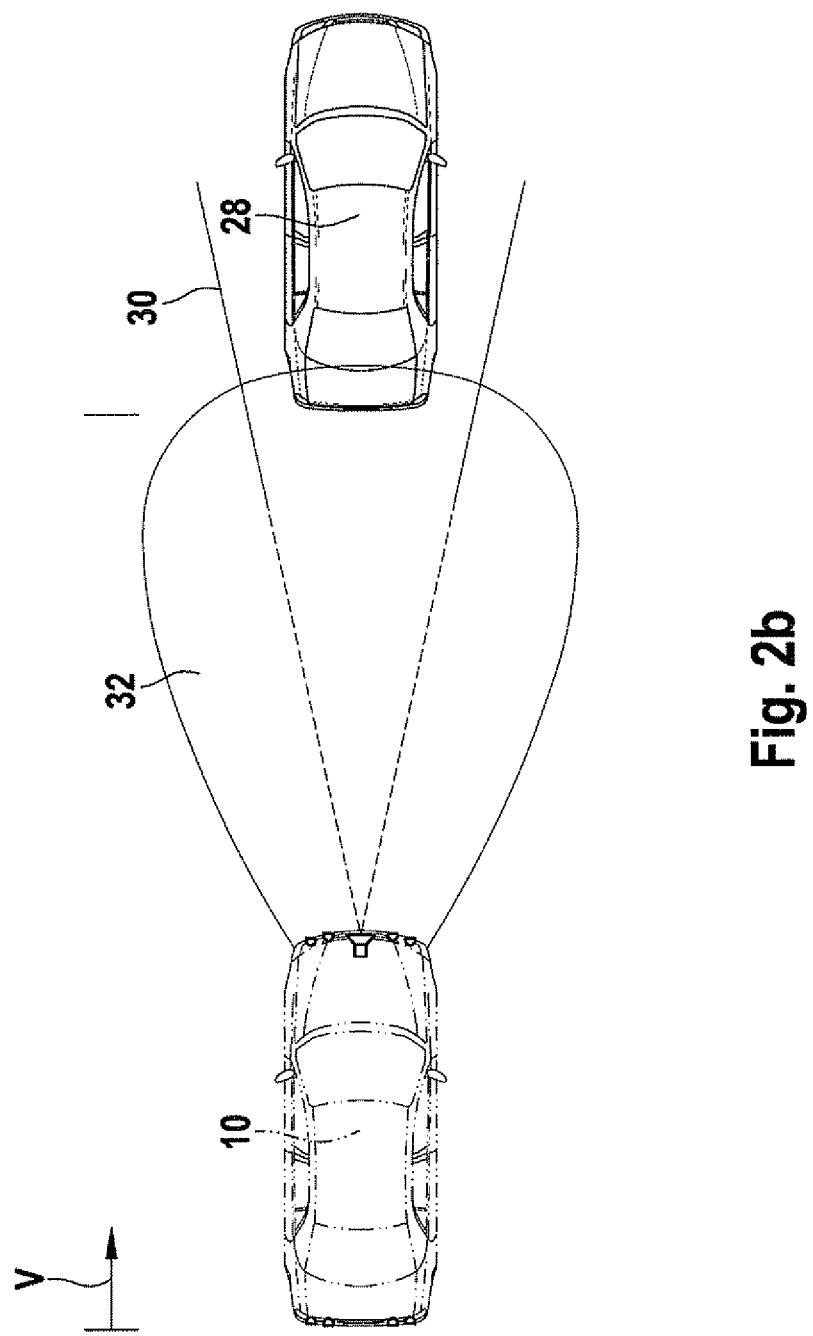
Figure 2C:
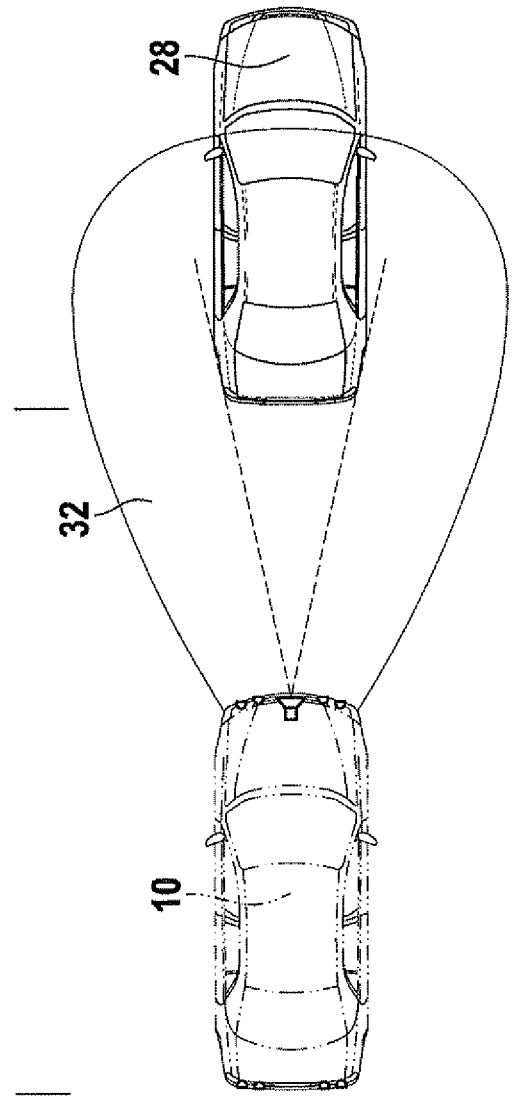

FIGS. 2a-c illustrate a situation in which vehicle 10, equipped with the systems according to FIG. 1, is approaching a vehicle 28 that is stopped further ahead in the same lane. A vector arrow V over vehicle 10, going out from a baseline, symbolizes that this vehicle is in motion. A baseline without a vector arrow over vehicle 28 is intended to indicate that vehicle 28 is at a standstill. In FIG. 2a, vehicle 28 is situated inside a cone-shaped location area 30 of remote region sensor 12, but is still situated outside a significantly shorter location area 32 of ultrasound sensors 16. The distance between vehicles 10 and 28 can consequently be monitored only using remote region sensor 12, and its distance data form the basis for the longitudinal guiding of vehicle 10 under the control of control unit 14.

From the fact that the speed, measured by remote region sensor 12, of vehicle 28 relative to vehicle 10 is equal in its magnitude to the inherent speed of vehicle 10, control unit 14 recognizes that vehicle 28 is a standstill. Control unit 14 therefore initiates a slowing process by which vehicle 10 is braked in such a way that it would normally come to a stop at a distance on the order of magnitude of approximately 5 meters behind vehicle 28. This distance corresponds to the standard stop distance also used during operation other than in city mode, such as on rural roads or highways.

In FIG. 2b, vehicle 10 has come still closer to vehicle 28, so that the rear of vehicle 28 is now also situated in location area 32 of the ultrasound sensors. Below a certain distance, which is for example on the order of magnitude of approximately 4 meters, the location data of remote region sensor 12 are no longer precise and reliable enough to provide a satisfactory distance controlling. In FIGS. 2a-c, this is symbolized in that the bounding lines in this lower distance area are shown as broken lines. In FIG. 2b, however, the distance of vehicle 28 is still large enough that it can be acquired by both location systems.

This condition, i.e., that the rear of vehicle 28 is situated in location range 22 of the ultrasound sensors, is recognized by control unit 14 on the basis of the data from remote region sensor 12, and control unit 14 thereupon sends a request for object detection to driver unit 20 of the USS system. This system thereupon activates front ultrasound sensors 16 and evaluates their detection signals. If all ultrasound sensors 16 (in the depicted example there are four) are operating properly, the rear of vehicle 28 is also detected by the ultrasound sensor system, and a corresponding detection and distance signal is sent to control unit 14 by driver unit 20.

If the USS system is not operating properly, for example because of a system disturbance or system failure, or because one or more of the ultrasound sensors 16 is occluded by dirt, this status is also reported to control unit 14. For safety reasons, the system can be designed such that driver unit 20 signals an error even if only one of ultrasound sensors 16 does not supply the expected signal. If none of the ultrasound sensors locates vehicle 28, control unit 14 recognizes, on the basis of the absence of the location signal, that the USS system is not operating properly.

In this way, control unit 14 can reliably determine whether the data supplied by the USS system concerning vehicle 28, and possibly concerning other objects at close range, are reliable or not. If these data are reliable, control unit 14 brings it about that vehicle 10 is not braked to a standstill according to the standard stopping characteristic; rather, shortly before coming to a standstill the vehicle goes into a creep mode in which it continues to roll forward at a very low speed. In a vehicle having automatic transmission and a torque converter, this creep mode can for example be realized in that the engine is idling but the brakes are released.

In FIG. 2c, vehicle 10, in creep mode, has come so close to vehicle 28 that the distance from the rear of this vehicle is now capable of being measured with sufficient reliability only by the ultrasound sensors. Control unit 14 continuously receives the distance signal sent by driver unit 20, and vehicle 10 is finally braked to a standstill only when the distance has decreased to a stop distance typical of city traffic, for example 2 meters.

While both vehicles 10 and 28 are at a standstill, front ultrasound sensors 16 remain active in order to monitor the area in front of the vehicle and to determine whether persons or other obstacles have moved into the driving corridor immediately in front of vehicle 10, so that a new start process would not be possible, or in any case not without particular attentiveness on the part of the driver.

Figure 3A:
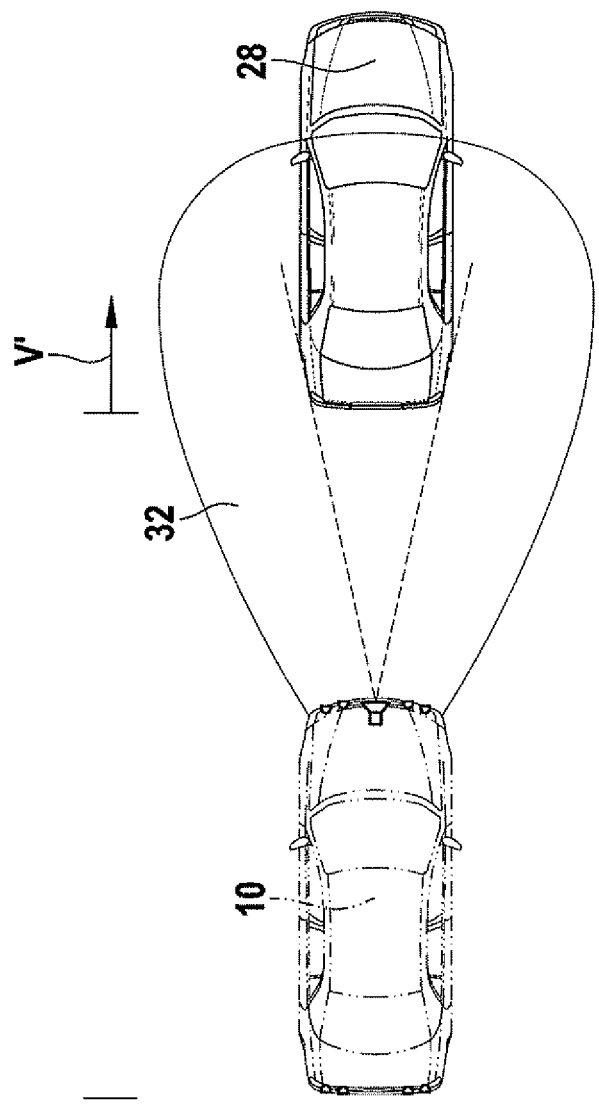
FIGS. 3a-c show an illustration of a start process controlled with the aid of the distance controller.
Figure 3B:
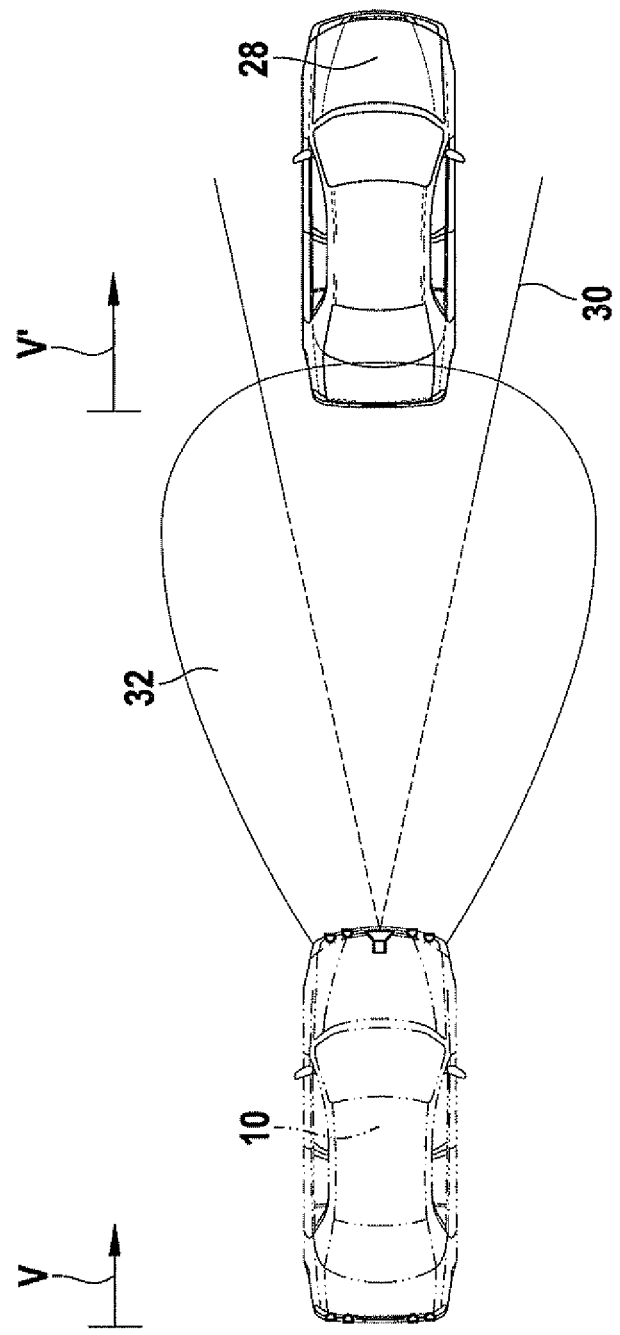
Figure 3C:
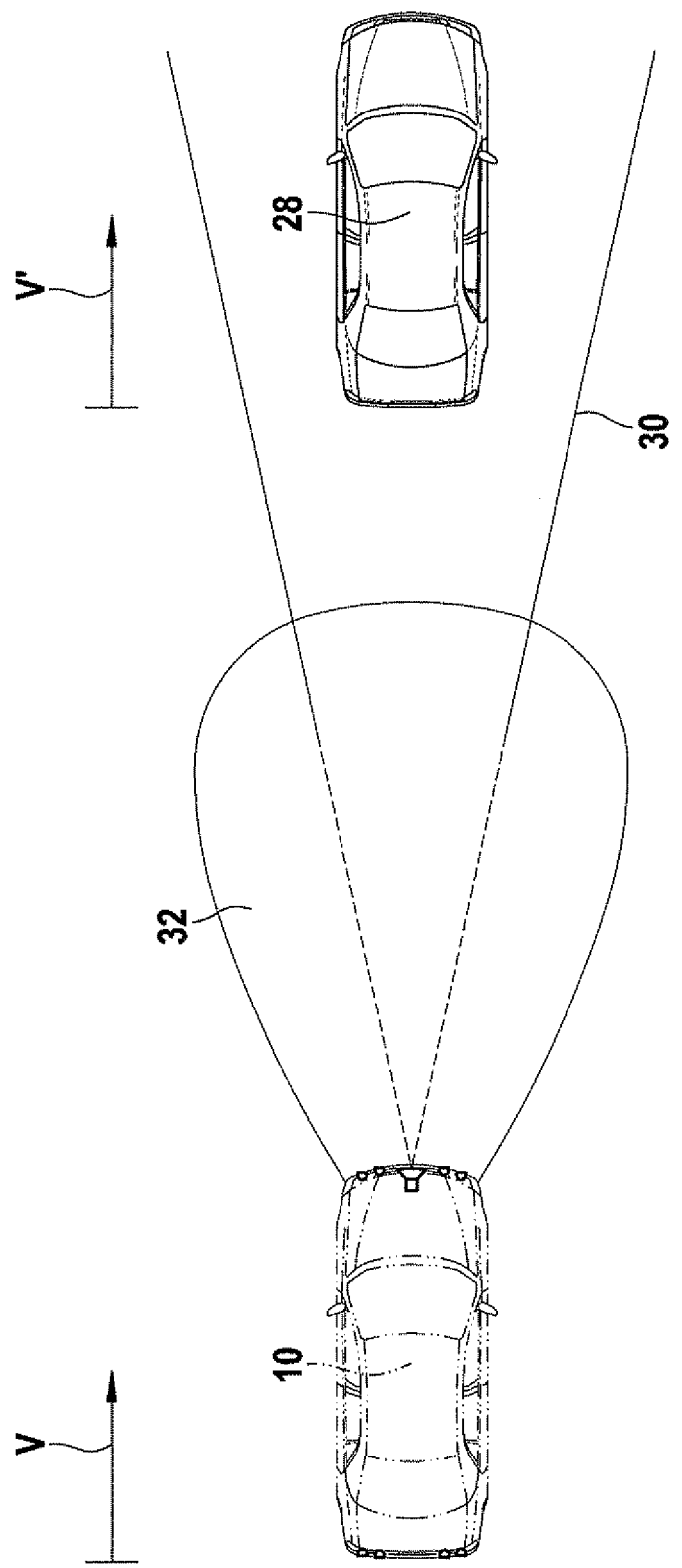

FIGS. 3a-c show, analogous to FIGS. 2a-c, an automatic start process. Here it is to be assumed that the area immediately in front of vehicle 10 is free.

In FIG. 3a, front vehicle 28 begins to move, as is symbolized by a vector arrow V'. Here, the initial situation is the same as in FIG. 2c; i.e., the distance between the two vehicles, at a standstill, is approximately 2 meters. Although the signal from remote region sensor 12 is unreliable in this state, using ultrasound sensors 16 it is possible to recognize, on the basis of a change in the vehicle distance, that vehicle 28 has started to move.

After checking that no other obstacles are situated in location area 32 of the ultrasound sensors, control unit 14 therefore gives the command for an automatic start process of vehicle 10. Under certain conditions, such as if both vehicles 10 and 28 have been at a standstill for a longer period of time, instead of the automatic start command a start instruction can be outputted to the driver of vehicle 10, and the automatic start process is initiated only when the driver has given the command to start by pressing a button.

Under the control of control unit 14, the vehicle brakes are released, and the (positive) acceleration of vehicle 10 is controlled on the basis of the signal of ultrasound sensors 16 in such a way that while vehicle 10 does start to move, its distance from vehicle 28 gradually becomes greater, corresponding to the increasing travel speed. This can for example take place in such a way that the engine management system of vehicle 10 autonomously controls the start process up to a particular minimum speed, while the ultrasound sensors monitor the distance from vehicle 28 and control unit 14 intervenes only in the sense of a reduction of the acceleration if this distance decreases or does not become greater quickly enough.

In FIG. 3b, both vehicles 10 and 28 are in motion, as indicated by vector arrows V and V'. The speed of vehicle 28 is greater than that of vehicle 10, and the distance between the two vehicles has increased enough that the distance and the relative speed can again be measured precisely using remote region sensor 12. If remote region sensor 12 supplies a consistent signal for the distance from vehicle 28, in control unit 14 a changeover takes place from controlling on the basis of the ultrasound sensors to controlling on the basis of remote region sensor 12, and front ultrasound sensors 16 are deactivated. This changeover process can take place already during the start program, in that the start process is fundamentally controlled autonomously by the engine management system of vehicle 10.

In FIG. 3c, the speeds of both vehicles have further increased and the distance has become greater to the point at which vehicle 28 can now be located only by remote region sensor 12. In this state, at a suitable minimum speed of vehicle 10 the transition takes place to "normal" ACC distance controlling.

Figure 4:
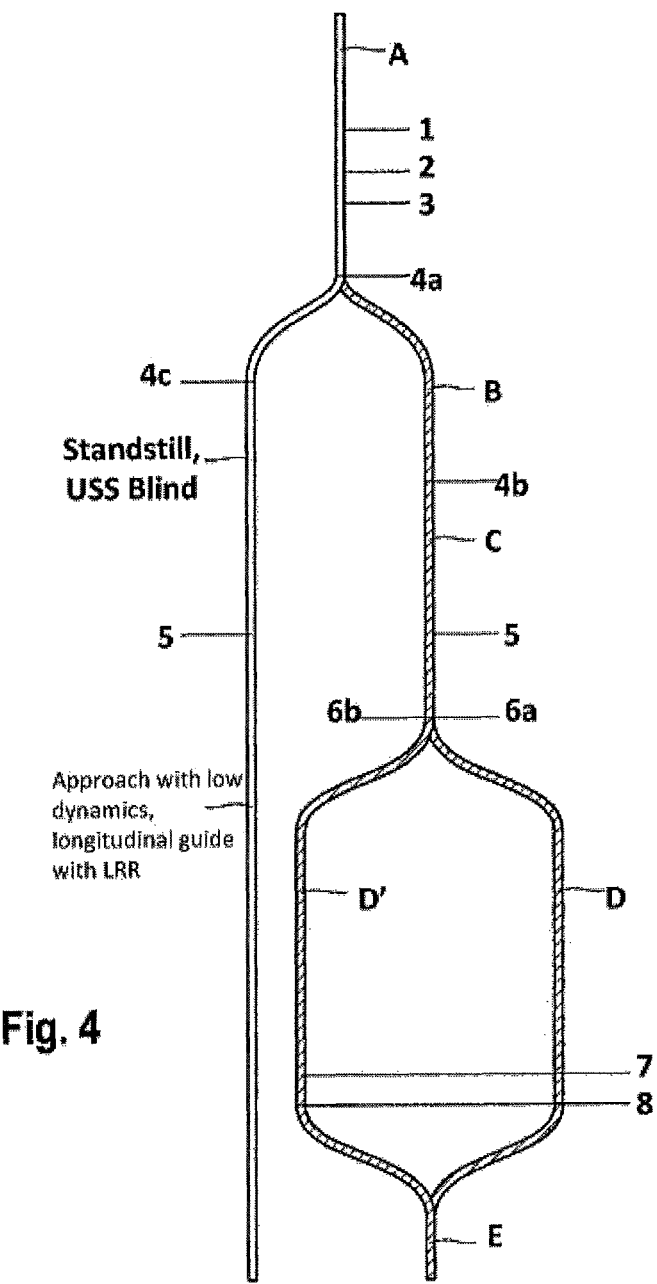
FIG. 4 shows a time diagram illustrating the manner of operation of the distance controller.

FIG. 4 shows some variants of the above-described basic sequences in somewhat more detailed form in a time diagram. The time axis runs from top to bottom.

In an operating mode A, both vehicles 10 and 28 are in motion, and the longitudinal guiding of vehicle 10 takes place on the basis of the signal from remote region sensor 12 (LRR). The distance between the two vehicles is controlled by control unit 14 to a prespecified target distance that is a function of speed, or, better expressed, a prespecified time gap. At a time 1, remote region sensor 12 determines that the target object, i.e. vehicle 28, has come to stop. Control unit 14 thereupon initiates a stop process of vehicle 10, in which vehicle 10 is braked to a standstill in controlled fashion, in such a way that it would come to a stop at a relatively large stop distance, for example 5 meters, behind vehicle 28 if the stop process were continued unchanged.

At a time 2, the distance between the vehicles has decreased to a point within the range of ultrasound sensors 16. This corresponds to FIG. 2b. Front ultrasound sensors 16 are thereupon activated, at a time 3.

If the ultrasound sensors are operating properly, vehicle 28 should be located by the ultrasound sensors within a relatively short time span, for example one second, or within a driving distance of approximately one meter. In the depicted example, this takes place at a time 4a. Control unit 14 thereupon goes into an operating mode B in which the longitudinal guiding of vehicle 10 takes place on the basis of the distance signal of ultrasound sensors 16 (hatched right arm of the time diagram in FIG. 4).

The original stop program for vehicle 10 is modified in such a way that the vehicle is not brought to a standstill already at a distance of 5 meters (d1), but instead goes into a creep mode in which it slowly continues to approach vehicle 28, the distance being monitored using the ultrasound sensors. Vehicle 10 is finally brought to a standstill only when, at a time 4b, the smaller stop distance of approximately 2 meters (d2) has been reached, and the system goes into an operating mode C, in which ultrasound sensors 16 continue to monitor whether vehicle 28 can still be located, and whether any other obstacles are situated in front of vehicle 10.

If, at a time 5, the ultrasound sensors determine that vehicle 28 has started to move again, it is again checked whether the lane is free, and, if this is confirmed at a time 6a, the system goes into an operating mode D in which a start process having a higher dynamic is initiated; i.e., vehicle 10 is set into motion immediately after vehicle 28 starts to move, and vehicle 10 is accelerated so strongly that the distance between the two vehicles becomes greater only gradually.

If at a time 7 the distance has increased far enough that vehicle 28 can again also be detected by remote region sensor 12, at a time 8 the ultrasound sensor system is deactivated and the system goes into an operating mode E in which, as in mode A, the longitudinal guiding again takes place on the basis of the signal of the remote region sensor.

If, after time 5, it is determined at a time 6b, using the ultrasound sensors 16, that an obstacle is situated immediately in front of vehicle 10, instead of going into mode D the system goes into a mode D' in which the longitudinal guiding also takes place on the basis of the ultrasound sensor system, but the start process is controlled with a lower dynamic. If warranted, in this case the start process is not initiated until a warning signal has been outputted to the driver and the start command has been confirmed by the driver. Moreover, the acceleration of vehicle 10 is less, so that the distance from vehicle 28 becomes greater more quickly, and the driver of vehicle 10 has the opportunity to react to, for example, obstacles that he perceives himself.

After operating mode D' as well, at time 8 a transition takes place to mode E, in which the longitudinal guiding is again taken over by remote region sensor 12.

The left branch in FIG. 4 represents the case in which, after the activation of ultrasound sensors 16 at time 3, the target object is not acquired at time 4a, but rather the prespecified time span (approximately one second) expires without verification of the target object by the ultrasound sensors. From this it must be concluded that ultrasound sensors 16, or at least one of them, are occluded, or that some other disturbance is present in the ultrasound sensor system, so that a distance controlling based on the ultrasound sensors is not possible. Therefore, the system remains in operating mode A, and at time 4c vehicle 10 is maintained at stop distance d1 of approximately 5 meters. Thus, the distance between the vehicles remains large enough that remote region sensor 12 supplies a reliable and evaluable signal even during the standstill phase, and can thus recognize a possible new start process of vehicle 28.

If, at time 5, vehicle 28 again starts to travel, in operating mode A a start process is initiated, under the control of remote region sensor 12, which has however a significantly lower dynamic than the start process in operating mode D. Due to this lower dynamic, in view of the occlusion of the ultrasound sensors it is ensured that the driver will himself check the lane to make sure it is free of obstacles, and will be able to react appropriately to any obstacles that may be present. If warranted, in this case as well, similar to operating mode D', the start process is not automatically initiated, and, if warranted, it is also not initiated after a start command given by the driver; rather, first a warning indication is outputted that informs the driver of the occlusion of the ultrasound sensor system, and the start process is initiated only if the driver nonetheless confirms the start command.

What is claimed is:

1. A distance controller having an automatic stop and/or start function for a motor vehicle, comprising:
   a distance-measuring remote region sensor;
   a distance-measuring ultrasound sensor; and
   a control unit adapted to intervene in a longitudinal guiding of the vehicle as a function of a distance, measured by the remote region sensor, from a vehicle traveling ahead, and, if the measured distance is less than a range of the ultrasound sensor, to verify based on a signal from the ultrasound sensor that the ultrasound sensor is functional, and then to evaluate a signal of the ultrasound sensor in the context of at least one of a stop and start function, wherein the at least one of the stop and start function has an operating mode in which a distance controlling takes place based on the signal of the ultrasound sensor, wherein the control unit is adapted to brake the vehicle to a standstill through longitudinal guiding based on the signal of the remote region sensor in such a way that the vehicle comes to a standstill at a first stop distance that is less than a maximum range of the ultrasound sensor if it has been determined that the vehicle traveling ahead is stopping or is at a standstill, and, given acquisition by the ultrasound sensor of the vehicle traveling ahead, to go into an operating mode in which, with longitudinal guiding based on the signal of the ultrasound sensor, in a creep travel mode the distance from the vehicle traveling ahead is further reduced until the vehicle is brought to a standstill at a smaller, second stop distance.

2. The distance controller as recited in claim 1, wherein the control unit is adapted to remain in an operating mode in which the longitudinal guiding takes place based on the signal of the remote region sensor, if, after the distance from the vehicle traveling ahead has decreased to a value that is less than the range of the ultrasound sensor, the front vehicle is also not detected by the ultrasound sensor within a prespecified time interval or travel distance interval.

3. The distance controller as recited in claim 1, wherein the start function has an operating mode in which the longitudinal guiding of the vehicle is based on the signal of the ultrasound sensor, wherein, in an operating mode in which the vehicle is in a standstill, the control unit is adapted to determine based on the signal of the ultrasound sensor whether a lane, apart from the stopped vehicle ahead, is free, or whether other obstacles are situated immediately in front of the vehicle.

4. The distance controller as recited in claim 3, wherein the start function has two operating modes in which the longitudinal guiding takes place based on the signal of the ultrasound sensor, the two operating modes differing in their dynamic, and wherein the control unit is adapted to select the operating mode having a lower dynamic if it has been determined that an obstacle is situated immediately in front of the vehicle.

5. The distance controller as recited in claim 4, wherein the control unit is adapted to output a warning signal to a driver before a start process is initiated in the operating mode having the lower dynamic.

6. The distance controller as recited in claim 5, wherein the control unit is adapted to initiate the start process after outputting the warning signal only if the driver gives a start command.

7. The distance controller as recited in claim 5, wherein the control unit is adapted to output a warning signal to the driver before the start function is initiated after the vehicle ahead has started to travel or after a start command from the driver during a standstill of the vehicle in the operating mode in which the longitudinal guiding is based on the signal of the remote region sensor.

\* \* \* \* \*